US011342820B1

(12) United States Patent
Wang et al.

(10) Patent No.: US 11,342,820 B1
(45) Date of Patent: May 24, 2022

(54) STATOR WELDING FIXTURE SYSTEM AND METHOD

(71) Applicant: GM GLOBAL TECHNOLOGY OPERATIONS LLC, Detroit, MI (US)

(72) Inventors: Hongliang Wang, Sterling Heights, MI (US); John S. Agapiou, Rochester Hills, MI (US); Dalton D. Matznick, Madison Heights, MI (US); Dmitriy Bruder, Auburn Hills, MI (US); Wuhua Yang, Superior Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/181,823

(22) Filed: Feb. 22, 2021

(51) Int. Cl.
*H01F 7/06* (2006.01)
*H02K 15/00* (2006.01)
*B23K 37/04* (2006.01)

(52) U.S. Cl.
CPC ..... *H02K 15/0081* (2013.01); *B23K 37/0443* (2013.01)

(58) Field of Classification Search
CPC .......... H02K 15/0081; B23K 37/0443
See application file for complete search history.

(56) References Cited

U.S. PATENT DOCUMENTS

| 8,443,509 | B1 | 5/2013 | De Souza et al. |
| 8,878,414 | B2 | 11/2014 | Mourou et al. |
| 9,742,225 | B2 * | 8/2017 | Klassen ................. H02K 1/278 |
| 2011/0259863 | A1 * | 10/2011 | Utaka .................... B23K 9/167 |
| | | | 219/137 R |
| 2012/0216398 | A1 * | 8/2012 | Agapiou ............ H02K 15/0081 |
| | | | 29/868 |
| 2014/0007415 | A1 * | 1/2014 | Corbinelli .......... H02K 15/0428 |
| | | | 29/596 |
| 2020/0136481 | A1 | 4/2020 | Agapiou et al. |

* cited by examiner

*Primary Examiner* — Paul D Kim
(74) *Attorney, Agent, or Firm* — Lorenz & Kopf LLP

(57) ABSTRACT

Systems and methods are provided for fixturing hairpins for joining by welding. A fixture system includes an outer structural ring fixed relative to an inner structural ring and mates with the component around its hairpin type conductor ends.ABSTRACT dielectric rings are disposed between conductor pairs. Clamp rings are disposed on opposite sides of the dielectric rings. One clamp ring and one dielectric ring define an opening receiving one conductor pair. Another clamp ring and another dielectric ring define another receiving another conductor pair. The clamp rings are movable toward one another to align and crowd the conductor pairs between the clamp rings and the dielectric rings prior to welding.

20 Claims, 9 Drawing Sheets

STATOR WELDING FIXTURE SYSTEM AND METHOD

INTRODUCTION

The present disclosure generally relates to electric machine manufacturing tooling for welding conductors, and more particularly relates to systems and methods that include fixturing features providing improved orientation and alignment of conductors in preparation for welding.

An increasing demand for electric motors, including in vehicle applications, is driving the development of motors that are smaller, lighter and powerful. In furtherance of these objectives, motor conductors of the hairpin type are increasingly being used. Hairpins are solid bars that are often rectangular in shape, made of copper, and are used in place of traditional round wire windings. The hairpins are preformed and a large number are locked in place, such as in slots of a stator lamination stack, and have ends that are exposed and an end is often in need of coupling with an adjacent hairpin or hairpins.

One way of coupling the conductors together involves joining by welding, such as by arc welding. Conductor joining tends to be a complex and time consuming operation. Challenges include producing quality joints with minimized heat related impact on other components of the product. The heat associated with welding may affect electrical isolating coatings and may leave unwanted deposits that may result in electrical shorts in the assembly. The complexity and time involved in welding hairpins serves as barriers to scaling up production rates of electrical machines that use this type of conductors.

Accordingly, the ability to produce quality welds in an electric machine conductor joining process is desirable. In addition, the ability to do so in a non-complex, efficient and fast manner is desirable. Furthermore, other desirable features and characteristics of the present invention will become apparent from the subsequent detailed description and the appended claims, taken in conjunction with the accompanying drawings and the foregoing technical field and introduction.

SUMMARY

Systems and methods are provided for fixturing an electric machine component for conductor joining, such as by welding. In a number of embodiments, a conductor set is contained by a component of an electric machine. A fixture system includes an inner structural ring configured to mate with the component on one side of the conductor set. An outer structural ring is fixed in position relative to the inner structural ring. The outer structural ring is configured to mate with the component on another side of the conductor set. At least one dielectric ring is configured to engage the component between a first conductor pair and a second conductor pair. A clamp ring is configured to engage the component between the inner structural ring and the first conductor pair, and is moveable relative to the inner structural ring. Another clamp ring is configured to engage the component between the outer structural ring and the second conductor pair, and is moveable relative to the outer structural ring. One clamp ring and the at least one dielectric ring define an opening configured to receive one conductor pair. Another clamp ring and the at least one dielectric ring define another opening configured to receive the other conductor pair. The clamp rings are configured to move toward one another to align and crowd the conductor pairs between the clamp rings and the at least one dielectric ring.

In additional embodiments, a welder is included to join each of the conductor pairs together at their respective ends, after the conductor pairs are aligned and crowded together.

In additional embodiments, a scanner is included to determine locations of the ends of the conductor pairs.

In additional embodiments, a driver is included to move the clamp rings toward one another.

In additional embodiments, the opening has one width on a side facing the component, and a smaller width on a side facing away from the component, so that the opening is tapered.

In additional embodiments, one or more dielectric ring includes a number of pins configured to extend into the conductor set.

In additional embodiments, a slide is contained by one structural ring and one clamp ring is fixed to the slide. An additional slide is contained by the other structural ring, and the other clamp ring is fixed to the additional slide.

In additional embodiments, the dielectric ring(s) are made of a material with a dielectric strength sufficient to electrically separate the conductor pairs from each other during operation of the component, without becoming electrically conductive.

In additional embodiments, the clamp rings each comprise a series of segments arranged in ring shapes.

In additional embodiments, clamp rings are nonconductive.

In additional embodiments, the conductors are hairpin type stator windings.

In a number of other embodiments, a method is provided for welding conductors of a conductor set that is contained by a component of an electric machine. A fixture system is constructed with an inner structural ring. An outer structural ring is fixed in position relative to the inner structural ring. The outer structural ring and the inner structural ring mate with the component so that the inner structural ring is on a first side of the conductor set and the outer structural ring is on a second side of the conductor set. The component is engaged with at least one dielectric ring disposed between two conductor pairs. The component is engaged with one clamp ring disposed between the inner structural ring and the first conductor pair, and the clamp ring is moveable relative to the inner structural ring. The component is engaged with an additional clamp ring disposed between the outer structural ring and the second conductor pair, and the additional clamp ring is moveable relative to the outer structural ring. One conductor pair is received in an opening defined by one of the clamp rings and one dielectric ring. The second conductor pair is received in another opening that is defined by the other clamp ring and another dielectric ring. The clamp rings are moved toward one another to align and crowd the conductor pairs between a respective clamp ring and a respective dielectric ring.

In additional embodiments, a welder joins pairs of conductor ends, after each conductor pair is aligned and crowded together.

In additional embodiments, a scanner determines locations of the conductor ends and a welder uses the determined locations in directing a weld beam.

In additional embodiments, a driver moves the clamp rings toward one another.

In additional embodiments, the opening is formed with one width on side facing the component and with a smaller width on a side facing away from the component, so that the opening is tapered.

In additional embodiments, the dielectric rings include a number of pins that extend into the conductor set.

In additional embodiments, one clamp ring is fixed to a slide contained by the inner structural ring and another clamp ring is fixed to another slide contained by the outer structural ring.

In additional embodiments, the clamp ring are each formed as a series of segments arranged in ring shapes.

In a number of other embodiments, a fixture system is provided for welding conductors of a conductor set contained by a component of an electric machine. An inner structural ring mates with the component on one side of the conductor set. An outer structural ring is fixed in position relative to the inner structural ring and mates with the component on another side of the conductor set. A dielectric ring engages the component between one conductor pair and a second conductor pair. Another dielectric ring engages the component between the second conductor pair and a third conductor pair. A clamp ring engages the component between the inner structural ring and one conductor pair and is moveable relative to the inner structural ring. Another clamp ring engages the component between the outer structural ring and the third conductor pair and is moveable relative to the outer structural ring. One clamp ring and one dielectric ring define an opening that receives one of the conductor pairs. Two dielectric rings define another opening that receives another conductor pair. The other clamp ring and one dielectric ring define a third opening that receives the third conductor pair. The clamp ring are moveable toward one another to align and crowd the conductor pairs, one pair between one clamp ring and a dielectric ring, another pair between the two dielectric rings, and a third pair between the other clamp ring and one of the dielectric rings.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
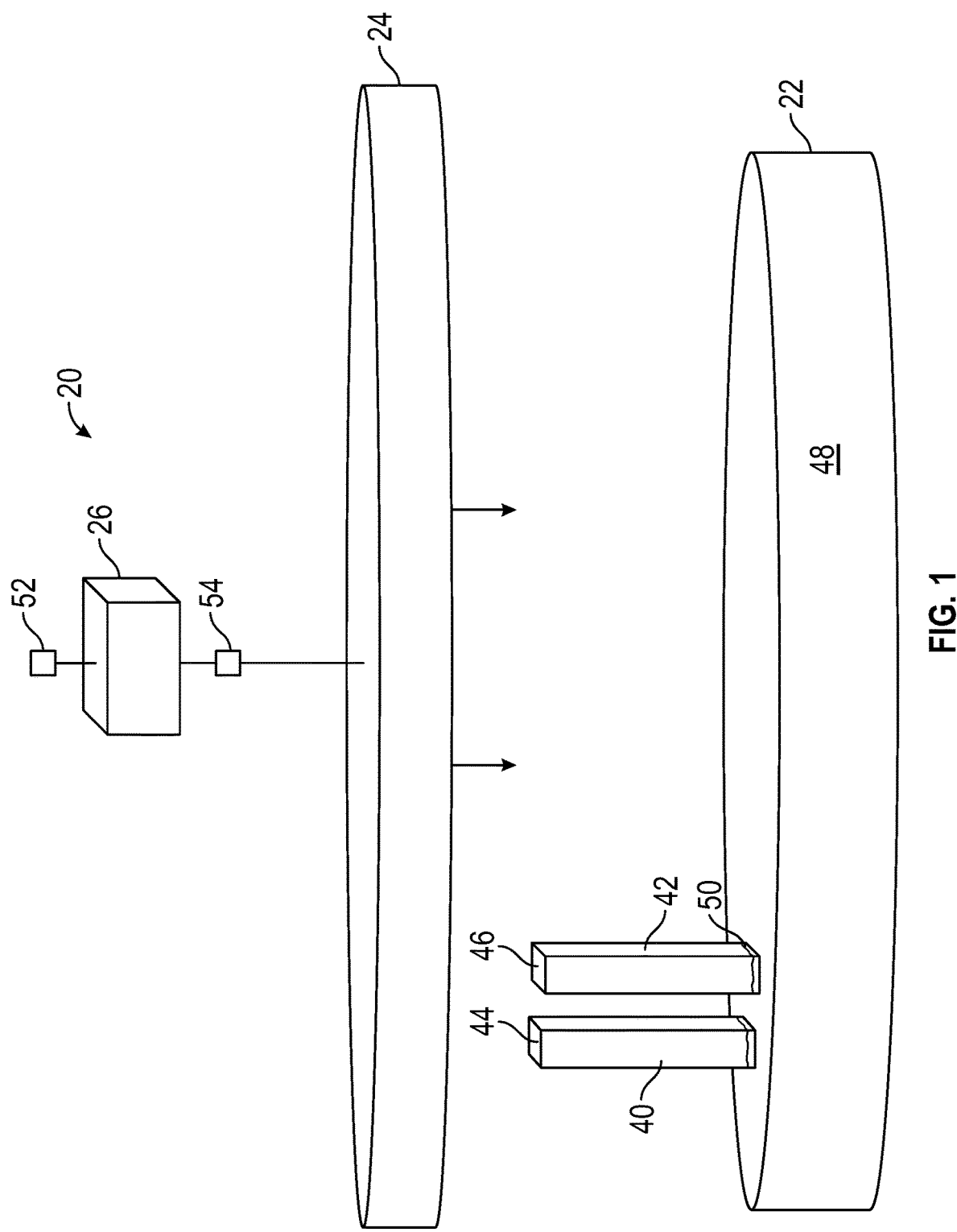
FIG. 1 is a schematic illustration of a welding fixture system including a fixture, a manipulator and an electric machine workpiece, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description.

As used herein, the term module refers to any hardware, software, firmware, electronic control component, processing logic, and/or processor device, individually or in any combination, including without limitation: application specific integrated circuit, an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of various systems, and that the system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In a number of embodiments, systems and methods include a fixture that aligns and crowds together conductor ends of an electric machine for welding of the ends together. The fixture includes multiple features to accurately and tightly crowd the conductor ends from plural directions. Dielectric rings may be applied between and around conductor end pairs to be joined, which assist in aligning and crowding. Rigid components of the fixture provide clamp force and rigidity. The fixture moves and holds the conductor ends in specified locations and orientations. The fixture may be an enabler for a three-dimensional vision system, where the system is able to provide reference surface and indexing data to coordinate aspects of the overall system. The system includes features that enable improved manufacturing quality in terms of conductor alignment, welding, insulation protection, weld spatter protection, and/or vision detection/inspection.

Figure 2:
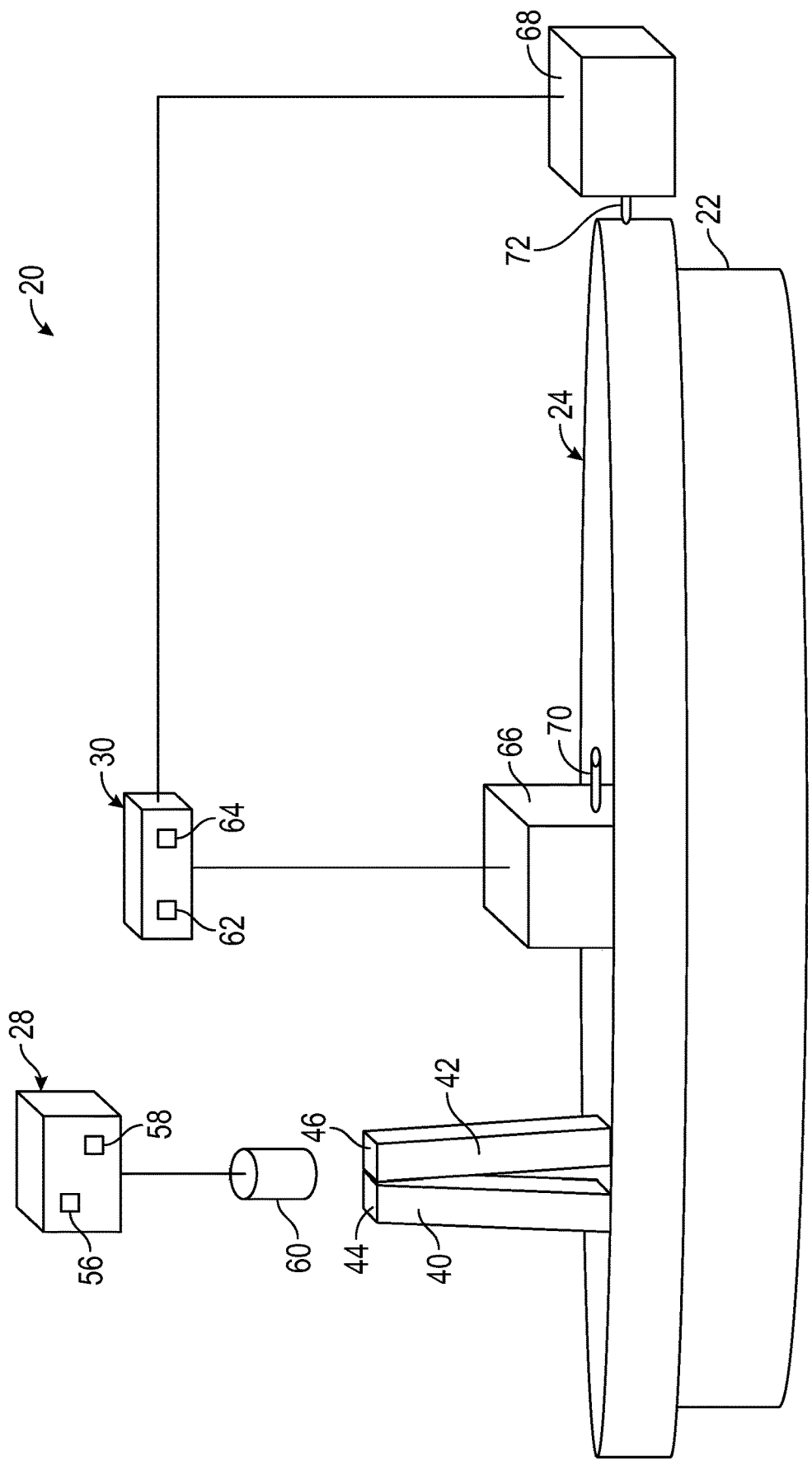
FIG. 2 is a schematic illustration of the welding fixture system of FIG. 1, with the fixture in place on the electric machine, a driver system engaging the fixture, and a vision system, in accordance with various embodiments.
Figure 3:
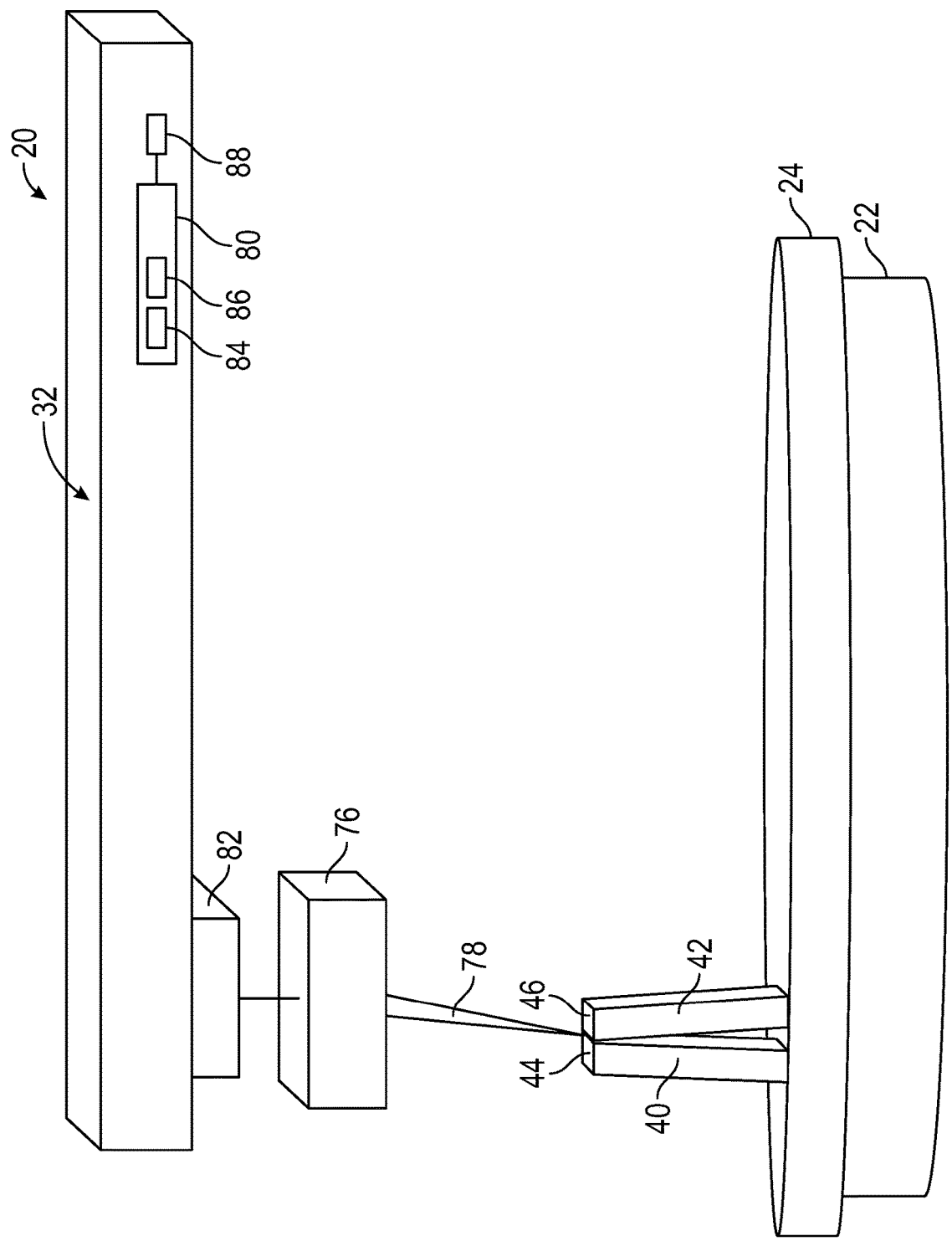
FIG. 3 is a schematic illustration of the welding fixture system of FIG. 1, including the fixture, and a welding system, in accordance with various embodiments.
Figure 4:
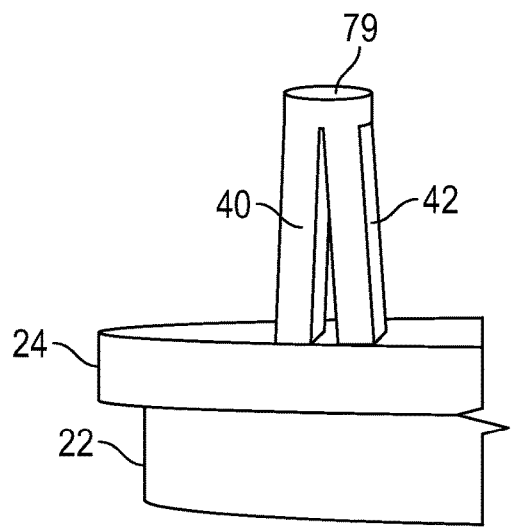
FIG. 4 is a schematic illustration of a joined conductor pair following operation of the welding fixture system of FIG. 1, in accordance with various embodiments.

Referring to FIGS. 1-4, illustrated is a welding fixture system 20 operating on an electric machine component, which in this case is a stator 22. In general, the welding fixture system 20 may include a fixture 24 that engages the stator 22 and is operated by a manipulator 26, a vision system 28, a driver system 30, and/or a joining system 32. The stator 22 includes a number of conductors, represented by conductors 40, 42, that require joining, such as at their respective tips/ends 44, 46. The stator 22, in the current embodiment, is a stator assembly with a lamination stack 48 containing the conductors 40, 42. It will be appreciated that the stator 22 may comprise any type of electric machine component in addition to stators, which include conductors that require joining for electrical continuity. In general, the fixture 24 as moved by the manipulator 26 aligns and crowds the conductors 40, 42. Aligning and crowding is accomplished with the assistance of the driver system 30. The vision system 28 provides reference surfaces for indexing and welding directivity in coordination with the global welding fixture system 20. The joining system 32 fuses the ends 44, 46 together, joining the conductors 40, 42 as shown in FIG. 4.

In the current embodiment, the stator 22 is configured to hold the winding arrangement, which may be embodied as a hairpin type. The lamination stack 48 may include a plurality of slots that receive the plurality of hairpin conductors 40, 42, etc. to form the armature winding arrangement. In other embodiments, another form of conductors may be used. The conductors 40, 42, etc. are inserted into the lamination stack 48 and present a number of ends 44, 46, etc. (weld ends) that require joining. The conductors 40, 42 generally have an insulation coating 50 for electrical isolation with stripped or noncoated ends 44, 46 in preparation for joining. The conductors 40, 42, etc. are arranged around the lamination stack 48 with a size, stripping, spacing, and a number determined according to the specifications of the stator 22. For example, a three-phase motor stator will have radially aligned rows of three conductor pairs 40, 42 arranged in annular shapes concentrically around the lamination stack 48. Ends 44, 46 of the same phase are disposed in pairs adjacent one another for joining. Other embodiments may exhibit a different conductor arrangement and a different number of pairs per row for joining. When the conductors 40, 42 are prepared in an assembly with the stator or lamination stack 48, manufacturing and tolerance variations may result in pair end 44, 46 locations that have a level of position differences as compared to other pairs. For quality welding results, accurate location data is beneficial.

As illustrated in FIG. 1, the fixture 24 exhibits a size and shape to mate with the stator 22. The manipulator 26 may be embodied as an automated robot, a manually assisted device, or a combination thereof, to move the fixture 24 through three-dimensional space. The manipulator 26 may include a control system with a controller 52 and any number of actuators 54 to lift, move, and place the fixture 24. In general, the fixture 24 is placed and mated with the stator 22 prior to welding, and is removed following welding.

As illustrated in FIG. 2, the fixture 24 is placed on the stator 22 and as a result, the ends 44, 46 are aligned and crowded together so that they come into contact, or approximate contact. Having aligned and crowded the ends 44, 46, the vision system 28 may determine their location in three-dimensional space and may include a controller 56 and any number of actuators 58 to move and operate a laser scanner 60. In other embodiments, a camera or another type of vision system/scanner may be used. Data is collected on the location, size and other features of the conductor ends 44, 46. The controllers 52, 56 may be communicatively coupled to work in cooperation, including sharing of the data. In some embodiments, the controllers 52, 56 may be one common controller.

Also shown in FIG. 2, the driver system 30 includes a controller 62 and any number of actuators 64 to manipulate and operate an inner driver 66 and an outer driver 68. In general, the inner driver 66 and the outer driver 68 operate to move sections of the fixture 24, such as by driving screws, to align and crowd the conductor ends 44, 46, etc. after the fixture 24 is placed on the stator 22. The inner driver 66 may include a number of drive heads 70 extending around the inner circumference of the fixture 24 and may simultaneously drive a number of features/screws to apply a clamping force to the conductors 40, 42, etc., from the inner side outward. The outer driver 68 may be annular in shape to extend around and encircle the fixture 24. The outer driver 68 may include a number of drive heads 72 extending around the outer circumference of the fixture 24 and may simultaneously drive a number of features/screws to apply a clamping force to the conductors 40, 42, etc., from the outward side inward. Through operation of the fixture 24, as driven by the drivers 66, 68, each conductor pair as represented by the conductor pair 40, 42 is aligned and crowed together in preparation for welding.

In the current embodiment as illustrated in FIG. 3, the joining system 32 is of the laser welding type. In other embodiments, another type of joining system may be used. Using a laser-type welder enables speeding up production rates for the stator 22, as compared to other types of welding. The laser 76 generates a beam 78 that delivers a focused heat source. The beam 78 is concentrated to a narrow area at the ends 44, 46 and delivers high welding rates. The beam 78 may be in the range of 40-500 microns, while the ends 44, 46 are significantly larger, such as with thicknesses of 1.5 millimeters or more. Accordingly, collected data on the location of the ends 44, 46 is referenced for determining the direction and application of the beam 78, which moves during the welding of one conductor pair. The joining system 32 includes a controller 80 and any number of actuators 82 to control position and operation of the laser 76. The controller 80 is coupled with the controller 56 and may reference the data collected by the vision system on three-dimensional location of the ends 44, 46. The 3D location provides the information about the relative position between the two conductor ends 44 and 46. The joining system 32 uses available data and programming to deliver heat in the form of the beam 78 to weld the ends 44, 46 together resulting in fusion with a weld bead 79 as illustrated in FIG. 4, and conductivity between the ends 44, 46 through the weld bead 79. The joining system 32 generates a path of the beam 78 that is determined by the controller 80 based on the 3D information for the two conductor ends 44, 46 to provide the required amount of heat at the specified location to generate the proper weld bead 79. The weld bead 79 produced has the required cross section and height in relation to the 3D alignment of the two ends 44, 46 to provide the required weld strength between the two welded conductors 40, 42.

In other embodiments, any number of controllers may be used in place of the controllers 52, 56, 62, 80 and in some embodiments only one controller may be used to provide all functions. For purposes of the current embodiment, the controller(s) 52, 56, 62, 80 control operation of the welding fixture system 20 including of the fixture 24, the vision system 28, the driver system 30 and the joining system 32. Operation is controlled through activation of the actuators 54, 58, 64, 82, and the laser 76. The actuator(s) 54, 58, 64, 82 may be a multi-axis positioning actuators to move objects through various heights, locations and orientations, or any other type of actuator sufficient for the given application. The controller(s) 52, 56, 62, 80 may comprise any number of electronic control modules and may receive various input variables of current operating conditions and other parameters. The inputs are analyzed and operating parameters such as operation of the fixture 24, the vision system 28, the driver system 30, the joining system 32 and others are computed from the data and applied to the various actuators and other responsive devices as appropriate. The controller (s) 52, 56, 62, 80 may receive various signals, including from various sensors (not shown), that provide information about the various controlled systems, conduct analyses, and send control signals to various destinations, including to the actuators 54, 58, 64, 82 and the laser 76. The sensors, including the laser scanner may sense various aspects of the electric machine component, the fixture 24, the laser scanner 60, the drivers 66 and 68 and the laser 76. The sensors may include any number of sensors for monitoring and operation/ status of the welding fixture system 20 and for determination of weld quality.

Each of the controllers 52, 56, 62, 80 may be constructed to meet functional requirements and the controller 80 will be described in greater detail with the understanding that each other controller controller(s) 52, 56 and 62 may include similar components. The controller 80 includes a processor 84 and a memory device 86, and is coupled with a storage device 88. The processor 84 performs the computation and control functions of the controller 80 and during operation executes one or more programs and may use data, each of which may be contained within the storage device 88, or received from other sources and as such, the processor 84 controls the general operation of the controller 80 in executing the processes described herein. The memory device 86 may be any type of suitable memory or combination of memory devices capable of storing data, some of which represent executable instructions, used by the controller 80. In the illustrated embodiment, the memory device 86 may store the above-referenced programs along with one or more stored values of the data such as for short-term data access. The storage device 88 stores data, such as for long-term data access for use in automatically controlling the welding fixture system 20 and may be any suitable type of storage apparatus. In an exemplary embodiment, the storage device 88 comprises a source from which the memory device 86 receives the programs and data. The programs represent executable instructions, used by the controller 80 in processing information and in controlling the welding fixture system 20 and its subsystems and devices. The processor 84 may generate control signals for the welding fixture system 20 based on the logic, calculations, methods, and/or algorithms.

Figure 5:
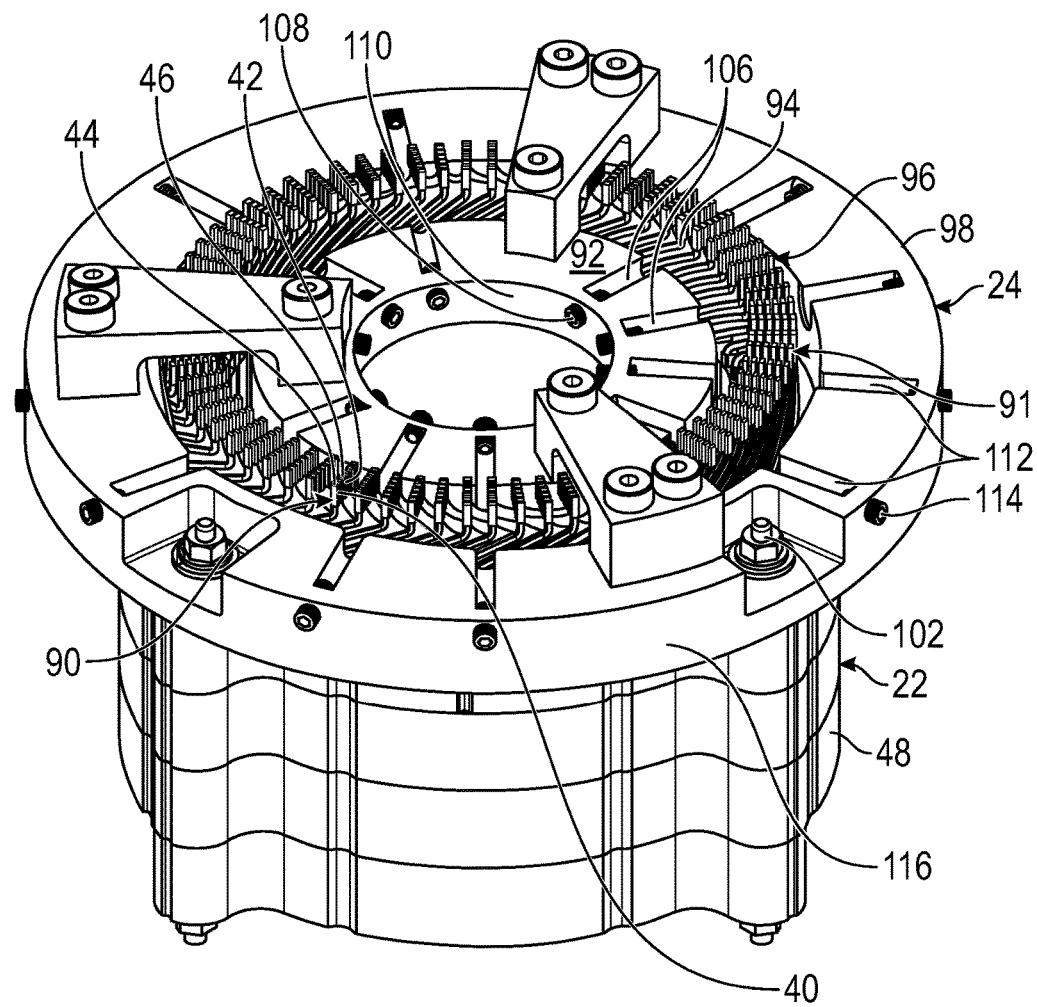
FIG. 5 is a perspective illustration of part of the welding fixture system of FIG. 1, in accordance with various embodiments.

Referring to FIG. 5, the base structural elements of the fixture 24 are illustrated disposed on the stator 22 with some parts of the fixture 24 omitted for visibility purposes. The lamination stack 48 contains the conductors 40, 42, etc. In the current embodiment, the electric machine component is a stator assembly for a three-phase motor with conductors/ windings of the hairpin type. The stripped ends 44, 46 are presented in pairs with six conductors/three pairs in a given row 90. The six conductors in each row 90 are disposed aligned in a radially extending row arrangement, and a number of rows are provided in annular collections around the circumference of the stator 22. In the aggregate, the conductors 40, 42, etc. form a conductor set 91. The conductors 40, 42, etc. extend out from the lamination stack with the ends 44, 46, etc. presented for joining.

The fixture 24 includes a rigid, inner structural ring 92 that surrounds the inner circumference side 94 of the conductor set 91, and includes a rigid, outer structural ring 98 that surrounds the outer circumference side 96 of the conductor set 91. The inner structural ring 92 is fixed with the outer structural ring 98 by a number of rigid braces 100 that hold the parts in position and together. The inner structural ring 92, the outer structural ring 98 and the braces 100 are made of a material to provide strength and rigidity such as metal and in a number of embodiments may be made of steel. When moved into position, the fixture 24 is fixed relative to the stator 22, in this embodiment by fasteners 102 that extend through tie rod holes of the lamination stack 48. In other embodiments, an automated fixing system may be employed to secure the fixture 24 relative to the stator 22, such as a clamp.

The inner structural ring 92 includes a number of slide pockets 106 that are disposed each with a radially extending orientation and that open radially outward toward the inner circumference side 94 of the conductor set 91. A screw 108 extends into each slide pocket 106 from the inside circumference 110 of the inner structural ring 92. The screws 108 are operated by the driver 66 of FIG. 2 to move parts of the fixture 24 toward or away from the inner circumference side 94 of the conductor set 91, as further described below. The outer structural ring 98 includes a number of slide pockets 112 that are disposed with a radially extending orientation and that open radially inward toward the outer circumference side 96 of the conductor set 91. A screw 114 extends into each slide pocket 112 from the outside circumference 116 of the outer structural ring 98. The screws 114 are operated by the driver 68 of FIG. 2 to move parts of the fixture 24 toward or away from the outer circumference side 96 of the conductor set 91, as further described below. Moving these parts of the fixture 24 provides a clamping action to crowd (force together), the conductors 40, 42 through a number of intermediate parts of the fixture 24 as described below.

Figure 6:
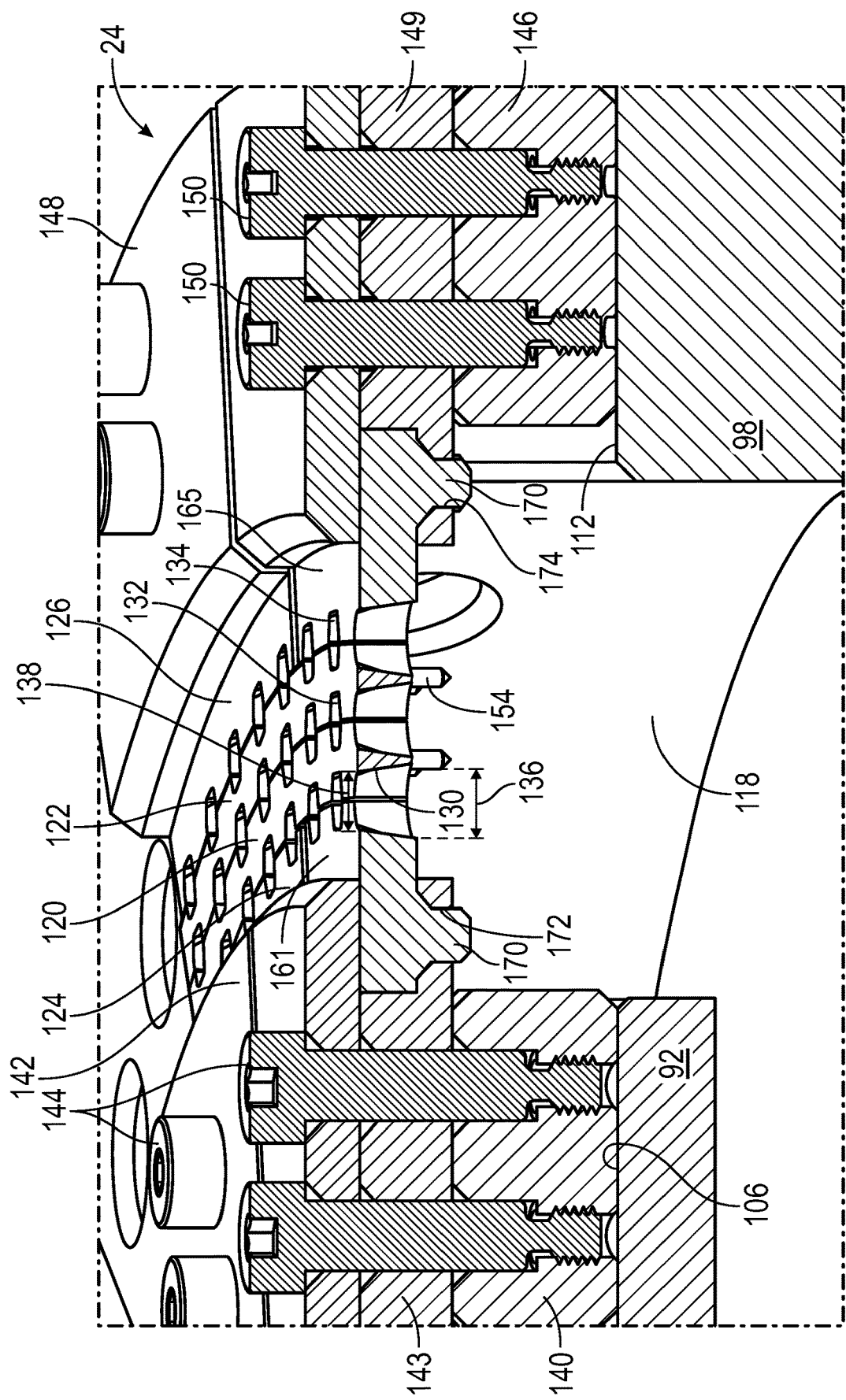
FIG. 6 is a fragmentary, sectional illustration of the welding fixture system of FIG. 1, in accordance with various embodiments.
Figure 7:
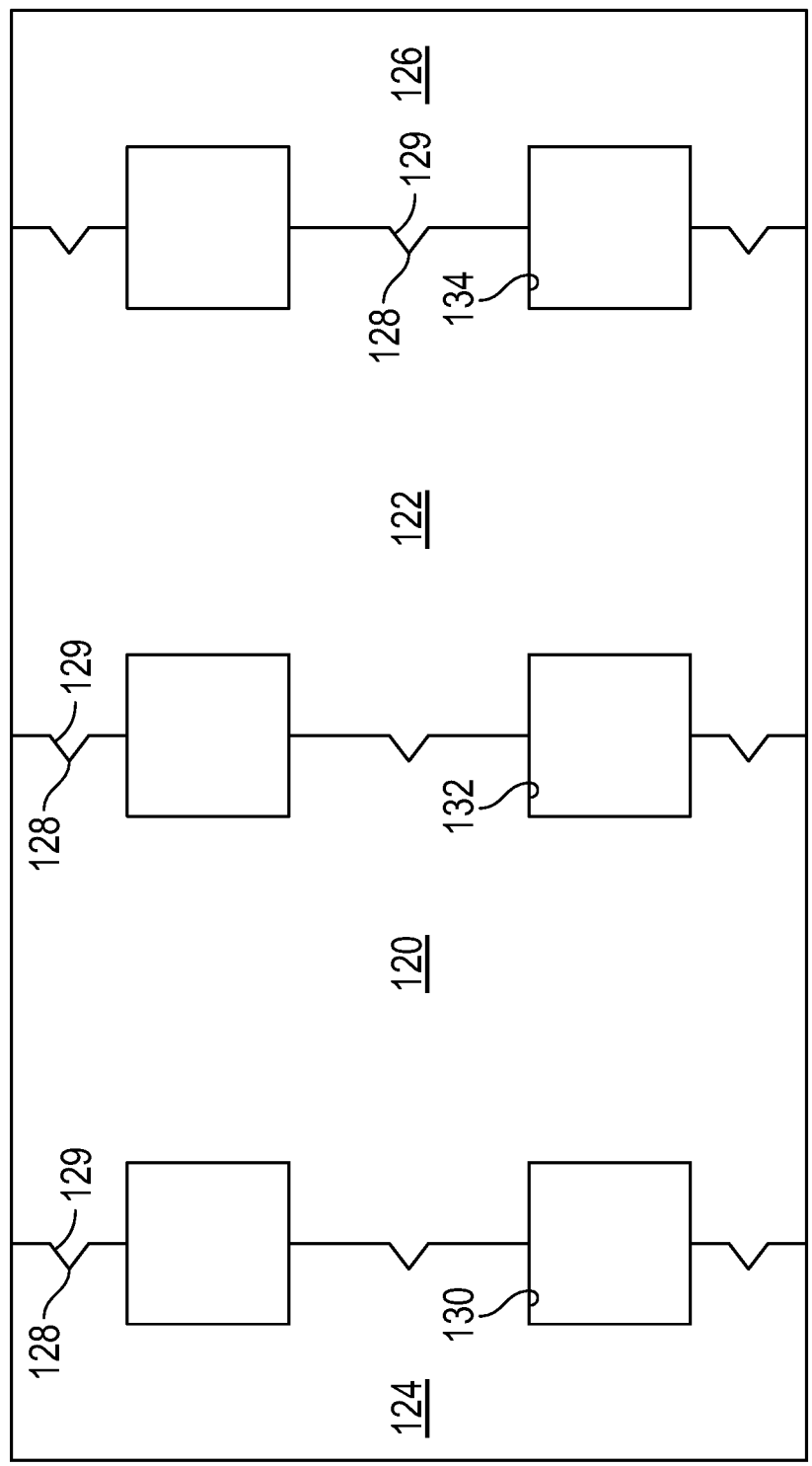
FIG. 7 is a plan detail view of the rings of FIG. 6, in accordance with various embodiments.

Referring to FIG. 6, the intermediate parts are shown in the fixture 24, which is shown assembled separate from the stator 22 for visibility. The inner structural ring 92 is spaced apart from the outer structural ring 98 defining a cavity 118 for receiving the conductor ends 44, 46, etc. of the conductor set 91. Extending across the top (as viewed) of the cavity 118 are the intermediate parts including dielectric rings 120, 122 and clamp rings 124, 126. Not visible in FIG. 6 but shown in FIG. 7 is that the dielectric rings 120, 122 and the clamp rings 124, 126 may each include projections 128 that are received in receptacles 129 of the adjacent ring, and that align the rings 120, 122, 124, 126 relative to each other. For example, the projections 128 and receptacles 129 may have a mating triangular shaped ridge/groove guiding alignment when the rings 120, 122, 124, 126 are brought together, as the openings 130, 132, 134 of each row are defined, each by an adjacent two of the rings 120, 122, 124, 126. Each opening 130, 132, 134 is tapered with a larger width 136 at the end facing the stator 22 and a relative smaller width 138 at the end facing away from the stator 22. This facilitates capturing the respective conductor pair 40, 42 in the larger width 136 as the fixture 24 is located and moved toward the stator 22, and the taper moves the conductor pair 40, 42 to be drawn together in alignment.

Figure 8:
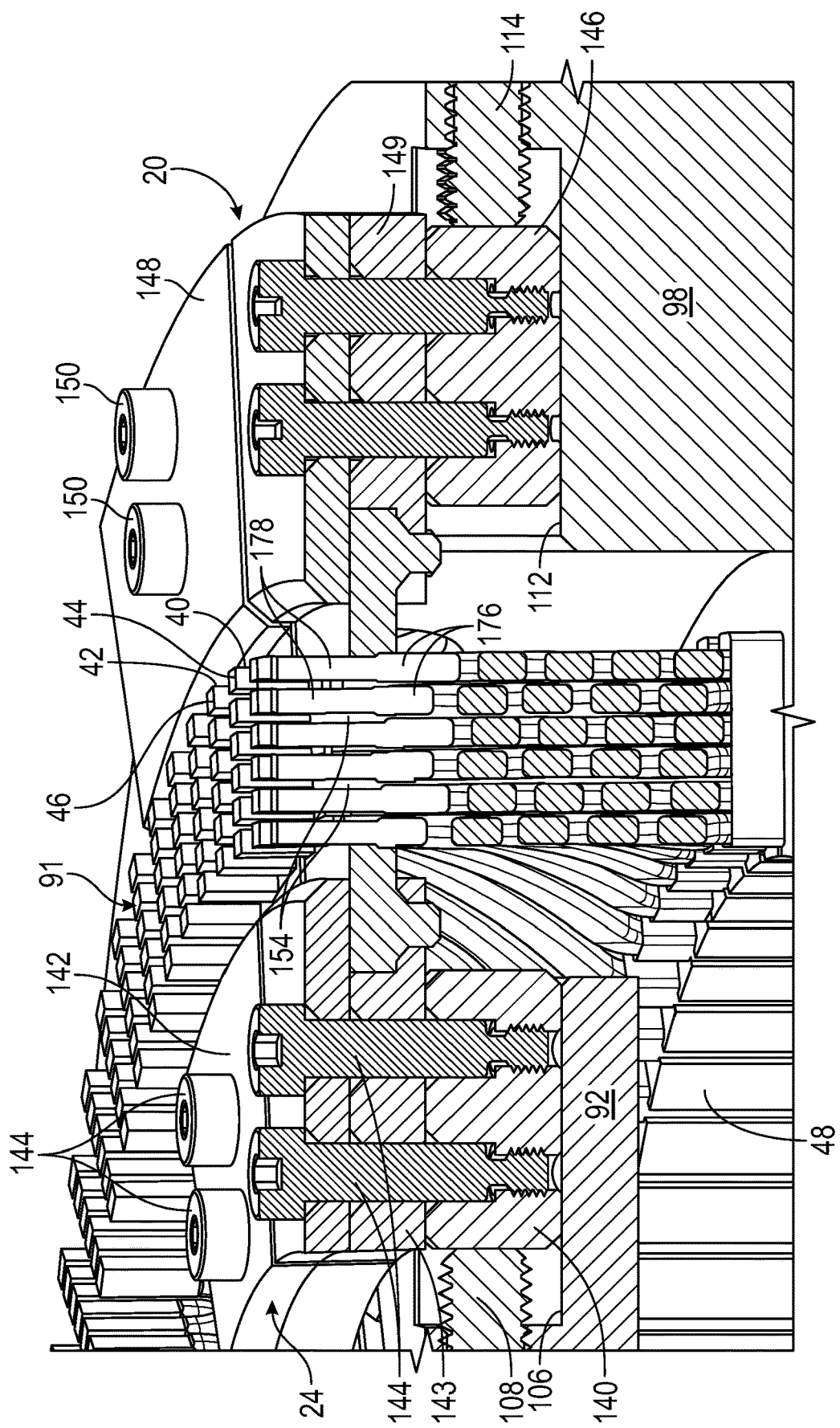
FIG. 8 is a perspective illustration of the welding fixture system and electric machine of FIG. 1, in accordance with various embodiments.

The fixture 24 captures the clamp ring 124 so that is moveable relative to the inner structural ring 92, using the slide pockets 106. Each slide pocket 106 contains a slide 140 to which the inner clamp ring 124 is attached, such as by a cover plate 142, a slide plate 143, and bolts 144. Referring additionally to FIG. 8 which shows the fixture 24 positioned on the stator 22, each slide 140 is engaged by one of the screws 108, to selectively move the clamp ring 124 toward or away from the conductor set 91, depending on the direction of rotation of the screws 108. In addition, the fixture 24 captures the clamp ring 126 so that is moveable relative to the outer structural ring 98, using the slide pockets 112. Each slide pocket 112 contains a slide 146 to which the outer clamp ring 126 is attached, such as by a cover plate 148, a slide plate 149, and bolts 150. Each slide 146 is engaged by one of the screws 114, to selectively move the clamp ring 126 toward or away from the conductor set 91, depending on the direction of rotation of the screws 114.

Figure 9:
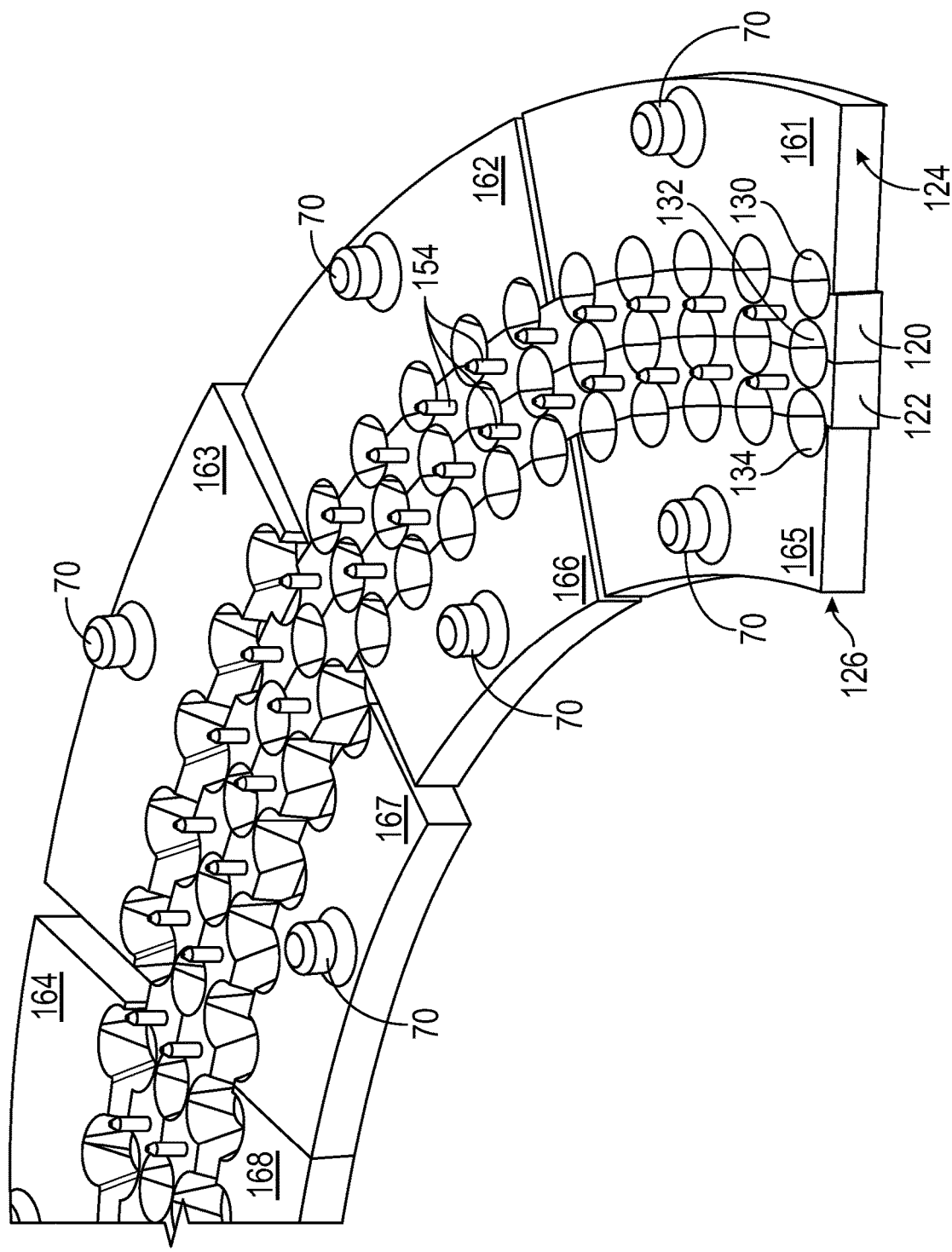
FIG. 9 is a detail, perspective illustration of part of the welding fixture system of FIG. 1, shown inverted, in accordance with various embodiments.

The rings 120, 122, 124, 126 are illustrated in FIG. 9 inverted and in aligned positions relative to one another. The dielectric rings 120, 122 are made of a one-piece, annular construction and comprise a polymer material with dielectric resistance and high temperature resistance. The material selected may have a temperature rating of up to approximately 200 degrees Celsius, with one nonexclusive example being polyamide. In the current embodiment with a three phase stator assembly have six conductor ends per row, two dielectric rings 120, 122 are used. In an application with four conductor ends per row, one ring 120 may be used. In an application with more than six conductor ends per row, more than two dielectric rings may be used, with each being disposed between an adjacent two pairs of conductor ends. Because they remain in place in the assembled electric machine, the dielectric properties of the rings 120, 122, are selected with a dielectric strength sufficient to separate the electricity in the three separate phases of the motor/electric machine during operation without undergoing electrical breakdown and becoming electrically conductive. The dielectric rings 120, 122 include projecting pins 154 located between each adjacent row of openings 130, 132, 134. The pins 154 extend into the stator 22 as shown in FIG. 6, providing positioning and alignment of the dielectric rings 120, 122 and the conductors 40, 42.

As shown in FIG. 9, the clamp ring 124 is made of a series of segments 161-164, etc. forming a segmented annular ring. Similarly, the clamp ring 126 is made of a series of segments 165-168, etc. forming a segmented annular ring. Each segment 161-168 is separately held by its respective structural ring 92, 98 as shown in FIG. 6 and is moveable with its respective slide 140, 146 under action of its respective screw 108, 114 to apply a clamping load to the conductor set 91. The screws may be adjusted either manually or with automation so that multiple screws for the inner slides and the outer slides are operated simultaneously. Sufficient clearance is provided between adjacent segments to allow radial movement. The segments 161-168, and therefore the clamp rings 124, 126, are made of a nonconductive, relatively tough material, with one example being ABS. The clamp rings 124, 126 are removed from the stator 22 following welding and therefore do not have the same dielectric requirements as the dielectric rings 120, 122. In addition, once loaded in the fixture 24 for the application, the clamp rings 124, 126 may be reused for a number of welding cycles.

To assist in holding the segments 161-168, each has a projection 170 that fits into a respective opening 172, 174 in the respective slide plate 143, 149. For example, the segments 163, 167 are shown in an initial position with the screws 108, 114 initially backed-off spreading the segments 163, 167 relative to the dielectric rings 120, 122. To releasably hold the initial position, the slides 140, 146 may be biased, such as by springs (not shown) to the initial positions, may be connected with the screws 108, 114, may be held in position by friction, such as against the cover plates 142, 148, or by other means. As the screws 108, 114 are rotated clockwise, the segments 161-168 are driven to move together and toward the dielectric rings 120, 122 to the positions of segments 161, 165. This movement crowds the hairpin ends 44, 46 together for joining, with the shape of the openings 130, 132, 134 helping align and position the ends 44, 46 and maintain proper separation between pairs. The rings 120, 122, 124, 126 provide sealing of the windings/hairpins inhibiting weld byproducts such as weld spatter from entering. In addition, portions of the rings 120, 122, 124, 126 are located around the insulated sections 176 of the conductors 40, 42, etc. and remaining top portions cover part of the stripped sections 178 as shown in FIG. 8, protecting the insulation coating during the welding process.

Figure 10:
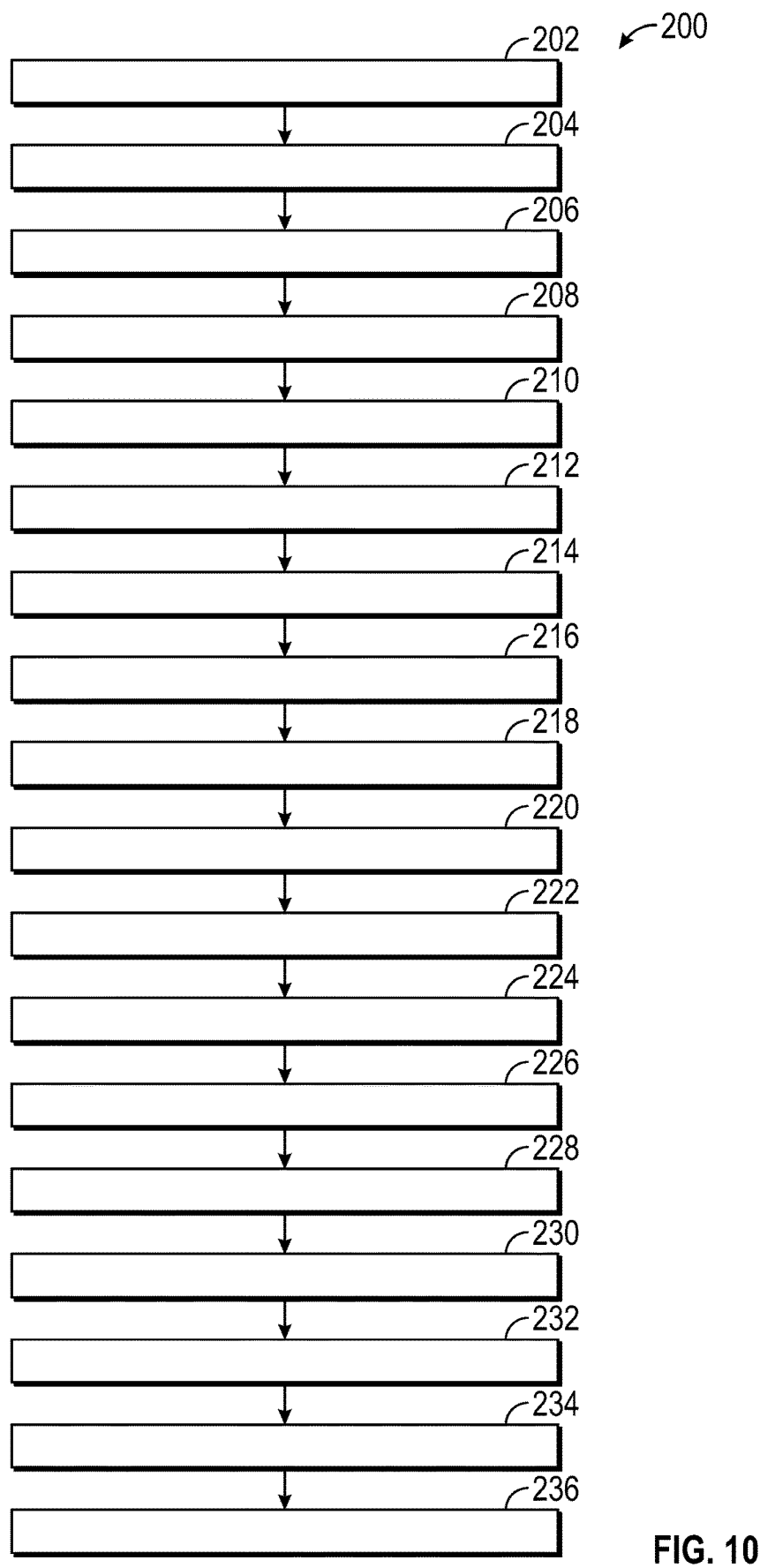
FIG. 10 is a flow chart of a process for operation of the welding fixture system of FIG. 1, in accordance with various embodiments.

Referring to FIG. 10, a process 200 is illustrated, which may be carried out using the welding fixture system 20 and any or all of its subsystems. The order of operation within process 200 is not limited to the sequential execution as illustrated in the FIG. 10, but may be performed in one or more varying orders as applicable and in accordance with the selected application. In addition, steps may be omitted, or other steps may be included. The process 200 begins with assembly 202 of the electrical machine component/stator 22 with the conductors 40, 42, etc. assembled to the lamination stack 48 with ends 44, 46 stripped or otherwise bare for establishing electrical conductivity therebetween. In the current embodiment, the electric machine component is the stator 22, but in other applications another type of component may be worked through the process 200. The conductors 40, 42, etc. comprise the conductor set 91 with the ends 44, 46, etc. presented in pairs for joining.

Continuing with the process 200, the dielectric rings 120, 122 are added 204 to the assembled stator 22 with the pins 154 extending into the assembly, such as between conductors 40, 42. The dielectric rings 120, 122 align with assistance of the projections 128 and receptacles 129. The clamp rings 124, 126 are added to the fixture 24. For example, the segments 161-168 are loaded 206 onto the slide plates 143, 149 with the projections 170 entering the openings 172, 174, and the bolts 144, 150 are tightened capturing the segments 161-168 under the cover plates 142, 148 and defining the clamp rings 124, 126. The segments 161-168 are all positioned 208 in the initial spread-apart position illustrated by the segments 163, 167 in FIG. 9.

The fixture 24 is grasped and moved, such as by the manipulator 26 under control of the controller 52 and the actuators 54 are operated to position 210 the fixture 24 onto the electric machine component/stator 22 as shown in FIG. 2. The fixture 24 is secured 212 to the stator 22, such as by the fasteners 102 shown in FIG. 5. The manipulator 26 may be withdrawn 214, and the driver system 30 is operated 216 with the drivers 66, 68 brought into position by the controller 62 operating the actuators 64. The drive heads 70, 72 are operated 216 to turn the screws 108, 114 moving the slides 140, 146 and the respective attached segments 161-168 applying 218 a clamp load between each opposed pair of segments, such as segments 161, 165. This applies a clamping load toward the dielectric rings 120, 122 and crowds each pair of conductor ends together. Alignment is assisted with help of the projections 128 and receptacles 129 while the openings 130, 132, 134 are defined each around a pair of conductor ends, such as conductor ends 44, 46. After application of the clamp load, the driver system 30 may withdraw 220 the drivers 66, 68 from the fixture 24.

Physical positioning and shapes of the aligned and crowded conductor end pairs 44, 46 are determined 222, such as by the vision system 28 scanning the conductor set 91 under operation of the controller 56 and the actuators 58. The vision system 28 may employ the laser scanner 60 to collect 224 data and the controller 56 saves the data. The data is communicated to the controller 80. The joining system 32 moves 226 into position for welding, such as through control by the controller 80 and operation of the actuators 82. The laser 76, responsive to the controller 80, produces the beam 78 to weld 228 the conductor ends 44, 46, etc. together. The controller 80 uses the data collected by the vision system 28 to direct the beam 78 efficiently and effectively targeting the ends 44, 46 for fusing together via a bead 79.

When all conductor end pairs are welded, the process 200 continues with retraction 230 of the laser 76. The fixture 24 is unlocked 232 from the stator 22. The fixture 24 is grasped and moved, such as by the manipulator 26 under control of the controller 52 and operation of the actuators 54 to retract 234 the fixture 24 from the electric machine component/stator 22. The clamp rings 124, 126 are retracted with the fixture 24 and the dielectric rings 120, 122 remain 236 in place in the stator 22. The process 200 is complete and remaining assembly of the electric machine using the stator 22 may commence.

Through the embodiments disclosed herein, a fixture aligns and crowds together conductor ends of an electric machine for welding of the ends together. The fixture includes multiple features to accurately and tightly crowd the conductor ends from plural directions. Dielectric rings are applied between and around conductor end pairs to be joined, which assist in aligning and crowding. Rigid components of the fixture provide clamp force and rigidity. The fixture holds the conductor ends in specified locations and orientations for joining by welding. The fixture enables scanning by a vision system, to collect location data for use by the welder. The system includes features that enable improved manufacturing quality in terms of conductor alignment, laser welding, insulation protection, weld spatter protection, and/or vision detection/inspection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements and/or steps without departing from the scope of the disclosure as set forth in the appended claims and the legal equivalents thereof.

What is claimed is:

1. A fixture system for welding conductors of a conductor set contained by a component of an electric machine, the fixture system comprising:
   an inner structural ring configured to mate with the component on a first side of the conductor set;
   an outer structural ring fixed in position relative to the inner structural ring, the outer structural ring configured to mate with the component on a second side of the conductor set;
   at least one dielectric ring configured to engage the component between a first conductor pair and a second conductor pair;
   a first clamp ring configured to engage the component between the inner structural ring and the first conductor pair, the first clamp ring moveable relative to the inner structural ring; and
   a second clamp ring configured to engage the component between the outer structural ring and the second conductor pair, the second clamp ring moveable relative to the outer structural ring,
   wherein the first clamp ring and the at least one dielectric ring define a first opening configured to receive the first conductor pair, and
   wherein the second clamp ring and the at least one dielectric ring define a second opening configured to receive the second conductor pair,
   wherein the first clamp ring and the second clamp ring are configured to move toward one another to align and crowd the first conductor pair between the first clamp ring and the at least one dielectric ring, and to align and crowd the second conductor pair between the second clamp ring and the at least one dielectric ring.

2. The fixture system of claim 1, further comprising a welder,
   wherein the first conductor pair presents a first pair of conductor ends,
   wherein the second conductor pair presents a second pair of conductor ends, and
   wherein the welder is configured to join the first pair of conductor ends together, and to join the second pair of conductor ends together, after the first conductor pair and the second conductor pair are aligned and crowded together.

3. The fixture system of claim 1, further comprising a scanner,
   wherein the first conductor pair presents a first pair of conductor ends,
   wherein the second conductor pair presents a second pair of conductor ends,
   wherein the scanner is configured to determine locations of the first pair of conductor ends and of the second pair of conductor ends.

4. The fixture system of claim 1, further comprising a driver, wherein
   the driver is configured to move the first and second clamp rings toward one another.

5. The fixture system of claim 1, wherein:
   the first opening has a first width on a first side facing the component, and a second width on a second side facing away from the component,
   wherein the first width is larger than the second width so that the first opening is tapered.

6. The fixture system of claim 1, wherein the at least one dielectric ring includes a number of pins configured to extend into the conductor set.

7. The fixture system of claim 1, further comprising:
   a first slide contained by the inner structural ring, the first clamp ring fixed to the first slide; and
   a second slide contained by the outer structural ring, the second clamp ring fixed to the second slide.

8. The fixture system of claim 1, wherein the at least one dielectric ring comprises a material with a dielectric strength sufficient to electrically separate the first conductor pair from the second conductor pair during operation of the component without becoming electrically conductive.

9. The fixture system of claim 1, wherein the first clamp ring and the second clamp ring each comprise a series of segments arranged in ring shapes.

10. The fixture system of claim 1, wherein the first clamp ring and the second clamp ring are nonconductive.

11. The fixture system of claim 1, wherein the conductors comprise hairpin type stator windings.

12. A method for welding conductors of a conductor set contained by a component of an electric machine, the method comprising:
constructing a fixture system with an inner structural ring;
fixing an outer structural ring in position relative to the inner structural ring;
mating the outer structural ring and the inner structural ring with the component so that the inner structural ring is on a first side of the conductor set and the outer structural ring is on a second side of the conductor set;
engaging the component with at least one dielectric ring disposed between a first conductor pair and a second conductor pair;
engaging the component with a first clamp ring disposed between the inner structural ring and the first conductor pair, the first clamp ring moveable relative to the inner structural ring;
engaging the component with a second clamp ring disposed between the outer structural ring and the second conductor pair, the second clamp ring moveable relative to the outer structural ring;
receiving the first conductor pair in a first opening defined by the first clamp ring and the at least one dielectric ring;
receiving the second conductor pair in a second opening defined by the second clamp ring and the at least one dielectric ring; and
moving the first clamp ring and the second clamp ring toward one another to align and crowd the first conductor pair between the first clamp ring and the at least one dielectric ring, and to align and crowd the second conductor pair between the second clamp ring and the at least one dielectric ring.

13. The method of claim 12, further comprising:
joining, by a welder, a first pair of conductor ends and the second pair of conductor ends, after the first conductor pair and the second conductor pair are aligned and crowded together.

14. The method of claim 12, further comprising:
determining, by a scanner, locations of a first pair of conductor ends and of a second pair of conductor ends; and
using, by a welder, the determined locations in directing a weld beam.

15. The method of claim 12, further comprising moving, by a driver, the first and second clamp rings toward one another.

16. The method of claim 12, further comprising:
forming the first opening with a first width on a first side facing the component, and with a second width on a second side facing away from the component; and
forming the first width larger than the second width so that the first opening is tapered.

17. The method of claim 12, further comprising:
including, on the at least one dielectric ring, a number of pins; and
extending the number of pins into the conductor set.

18. The method of claim 12, further comprising:
fixing the first clamp ring to a first slide contained by the inner structural ring; and
fixing the second clamp ring to a second slide contained by the outer structural ring.

19. The method of claim 12, further comprising forming the first clamp ring and the second clamp ring each as a series of segments arranged in ring shapes.

20. A fixture system for welding conductors of a conductor set contained by a component of an electric machine, the fixture system comprising:
an inner structural ring configured to mate with the component on a first side of the conductor set;
an outer structural ring fixed in position relative to the inner structural ring, the outer structural ring configured to mate with the component on a second side of the conductor set;
a first dielectric ring configured to engage the component between a first conductor pair and a second conductor pair;
a second dielectric ring configured to engage the component between the second conductor pair and a third conductor pair;
a first clamp ring configured to engage the component between the inner structural ring and the first conductor pair, the first clamp ring moveable relative to the inner structural ring; and
a second clamp ring configured to engage the component between the outer structural ring and the third conductor pair, the second clamp ring moveable relative to the outer structural ring,
wherein the first clamp ring and the first dielectric ring define a first opening configured to receive the first conductor pair,
wherein the first dielectric ring and the second dielectric ring define a second opening configured to receive the second conductor pair,
wherein the second clamp ring and the second dielectric ring define a third opening configured to receive the third conductor pair, and
wherein the first clamp ring and the second clamp ring are configured to move toward one another to align and crowd the first conductor pair between the first clamp ring and the first dielectric ring, to align and crowd the second conductor pair between the first dielectric ring and the second dielectric ring, and to align and crowd the third conductor pair between the second clamp ring and the second dielectric ring.

* * * * *